United States Patent
Tondorf et al.

(10) Patent No.: US 8,001,700 B2
(45) Date of Patent: Aug. 23, 2011

(54) SCANNING UNIT OF A POSITION MEASURING ARRANGEMENT

(75) Inventors: Sebastian Tondorf, Waging am See (DE); Markus Kühler, Nußdorf/Sondermoning (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 298 days.

(21) Appl. No.: 12/313,721

(22) Filed: Nov. 24, 2008

(65) Prior Publication Data
US 2009/0141276 A1    Jun. 4, 2009

(30) Foreign Application Priority Data
Dec. 4, 2007  (DE) .................. 10 2007 058 643

(51) Int. Cl.
 *G01D 5/347*    (2006.01)
 *G01B 11/02*    (2006.01)
(52) U.S. Cl. .......................... 33/706; 33/702
(58) Field of Classification Search ............. 33/702–708, 33/700; 356/615, 616
 See application file for complete search history.

(56) References Cited

U.S. PATENT DOCUMENTS

| | | | | |
|---|---|---|---|---|
| 5,050,311 A | * | 9/1991 | Nelle | 33/704 |
| 5,995,229 A | * | 11/1999 | Omi | 356/616 |
| 6,084,234 A | * | 7/2000 | Stridsberg | 250/231.16 |
| 6,721,034 B1 | * | 4/2004 | Horikawa | 355/53 |
| 7,289,212 B2 | | 10/2007 | Kwan | 356/399 |
| 7,557,469 B2 | * | 7/2009 | Emoto | 310/12.24 |
| 7,788,821 B2 | * | 9/2010 | Affa et al. | 33/706 |
| 2004/0263846 A1 | | 12/2004 | Kwan | 356/399 |
| 2005/0087682 A1 | * | 4/2005 | Ito | 250/231.13 |
| 2006/0016088 A1 | * | 1/2006 | Kawada et al. | 33/706 |
| 2007/0102631 A1 | * | 5/2007 | Pucher et al. | 250/234 |

FOREIGN PATENT DOCUMENTS

| | | | |
|---|---|---|---|
| DE | 102009027107 A1 | * | 12/2010 |
| JP | 59216001 A | * | 12/1984 |
| JP | 11143545 A | * | 5/1999 |

* cited by examiner

*Primary Examiner* — R. A. Smith
(74) *Attorney, Agent, or Firm* — Brinks Hofer Gilson & Lione

(57) ABSTRACT

A scanning unit of a position measuring arrangement for scanning a measuring graduation of a scale. The scanning unit includes a base body including an interior space; wherein the base body can be installed, fixed in place, on an object to be measured, wherein the base body comes into contact with a first contact face at a first location of the object to be measured. The scanning unit includes a heat-generating electrical component in the interior and a contact element with a second contact face which, in the course of installing the base body, enters into contact at a second location of the object to be measured. The scanning unit further including a heat-conducting element, which is designed for transferring heat generated by an electrical component from the interior space to the contact element.

14 Claims, 4 Drawing Sheets

SCANNING UNIT OF A POSITION MEASURING ARRANGEMENT

RELATED APPLICATIONS

Applicants claim, under 35 U.S.C. §119, the benefit of priority of the filing date of Dec. 4, 2007 of a German patent application, copy attached, Serial Number 10 2007 058 643.6, filed on the aforementioned date, the entire contents of which is incorporated herein by reference.

BACKGROUND

1. Technical Field

The present invention relates to a scanning unit of a position measuring arrangement for scanning the measuring graduation of a scale, having at least one heat-generating electrical component in an interior space of the scanning unit, a base body, which can be installed, fixed in place, on an object to be measured, wherein the base body comes into contact with a first contact face at a first location of the object to be measured, and having a contact element with a second contact face which, in the course of installing the base body, comes into contact at a second location of the object to be measured, and with a heat-conducting path, which is designed for transferring heat generated by the electrical component from the interior space of the scanning unit to the contact element.

2. Background Information

Position measuring arrangements, such as are described in U.S. Patent Application Publication No. 2004/0263846, the entire contents of which are incorporated herein by reference, for example, are used for measuring lengths, as well as paths, and are employed in particular in connection with processing machinery for measuring the relative movement of a tool with respect to a workpiece to be processed, and also increasingly in the semiconductor industry for positioning wafers.

The demands made on position measuring arrangements continue to increase, higher resolution, as well as greater accuracy and reproducibility of the position measuring arrangement, are continuously demanded. At the same time it is desired that a compact design, as well as a simple and interference-proof measured value generation, are provided.

A compact design and an interference-proof measured value generation and measured value transmission require the integration of increasingly more electrical components in the scanning unit itself. Sensor chips are therefore increasingly employed, in which an array of scanning sensors can be arranged in the smallest space, for example photo-sensitive detectors, in case of a scale which can be scanned photo-electrically, as well as signal processors such as, for example, A/D converters, amplifiers, micro-processors and interfaces. In addition, the measuring graduation to be scanned by the scanning unit becomes increasingly finer, and the displacement speed of the scanning unit in relation to the scale becomes increasingly higher, which leads to a considerable increase in the frequency of the scanning signals which must be processed by the signal processors. The amplifiers required for this processing generate relatively much heat. An increased heat generation in the scanning unit results from this. On the one hand, this heat affects the electrical components themselves in a negative manner in that their service life is reduced and characteristic data change over time. On the other hand, the heat also negatively affects the mechanical portion of the scanning component in that components of the scanning unit expand in an undefined manner, which can lead to measurement inaccuracies.

OBJECTS AND SUMMARY OF THE INVENTION

An object of the present invention is therefore based on disclosing a scanning unit, by which a high degree of measuring accuracy can be achieved.

In accordance with the present invention, this object is attained by a scanning unit of a position measuring arrangement for scanning a measuring graduation of a scale. The scanning unit includes a base body including an interior space; wherein the base body can be installed, fixed in place, on an object to be measured, wherein the base body comes into contact with a first contact face at a first location of the object to be measured. The scanning unit includes a heat-generating electrical component in the interior and a contact element with a second contact face which, in the course of installing the base body, enters into contact at a second location of the object to be measured. The scanning unit further including a heat-conducting element, which is designed for transferring heat generated by an electrical component from the interior space to the contact element.

A compact design of a scanning unit is made possible by the present invention, and a high degree of measuring accuracy and a reproducible position measurement can be achieved.

This is achieved by a scanning unit of a position measuring arrangement for scanning a measuring graduation, having:

at least one heat-generating electrical component in an interior space of the scanning unit, a base body, which can be installed, fixed in place, on an object to be measured, wherein the base body comes into contact with a first contact face at a first location of the object to be measured, a contact element with a second contact face which, in the course of installing the base body, enters into contact at a second location of the object to be measured, and with a heat-conducting path, which is designed for transferring heat generated by the electrical component from the interior space of the scanning unit to the contact element.

A particularly advantageous design results if the second contact face is designed to be elastically resilient. To this end the second contact face is a part of a resilient sheet metal element, which is embodied to be resiliently deflectable in the direction of the second location on the object to be measured. Alternatively to this, the second contact face, or respectively the contact element, can be flexibly arranged on the base body by a resilient structure. This resilient structure can simultaneously perform the function of a seal between the contact element and the base body.

The second contact face is preferably a part of a removable cover, which covers the interior of the scanning unit.

In the uninstalled state, the first contact face has been set back with respect to the second contact face. Because of this, the first contact face contacts the object to be measured only after the second contact face already is in contact with the object to be measured.

The contact element is preferably arranged in a heat-insulated manner with respect to the base body, so that heat which is to be removed is not transferred to the base body.

The heat-conducting path from the heat-generating electrical component to the contact element preferably includes a heat-conducting element which is designed to be elastic. It is preferably also electrically insulating. This heat-conducting element is arranged, in particular clamped, between the heat-generating electrical component and the contact element. In this case the heat-conducting element contacts the electrical component on the one hand, and the contact element on the other, in a heat-transferring manner.

The scanning plate, which contributes to the determination of the accuracy of the position measurement, is preferably fixed in place on the base body.

Further advantages, as well as details of the length measuring arrangement and scanning unit in accordance with the present invention ensue from the following description of an exemplary embodiment by the attached drawings.

DETAILED DESCRIPTION OF THE PREFERRED EMBODIMENTS

Figure 1:
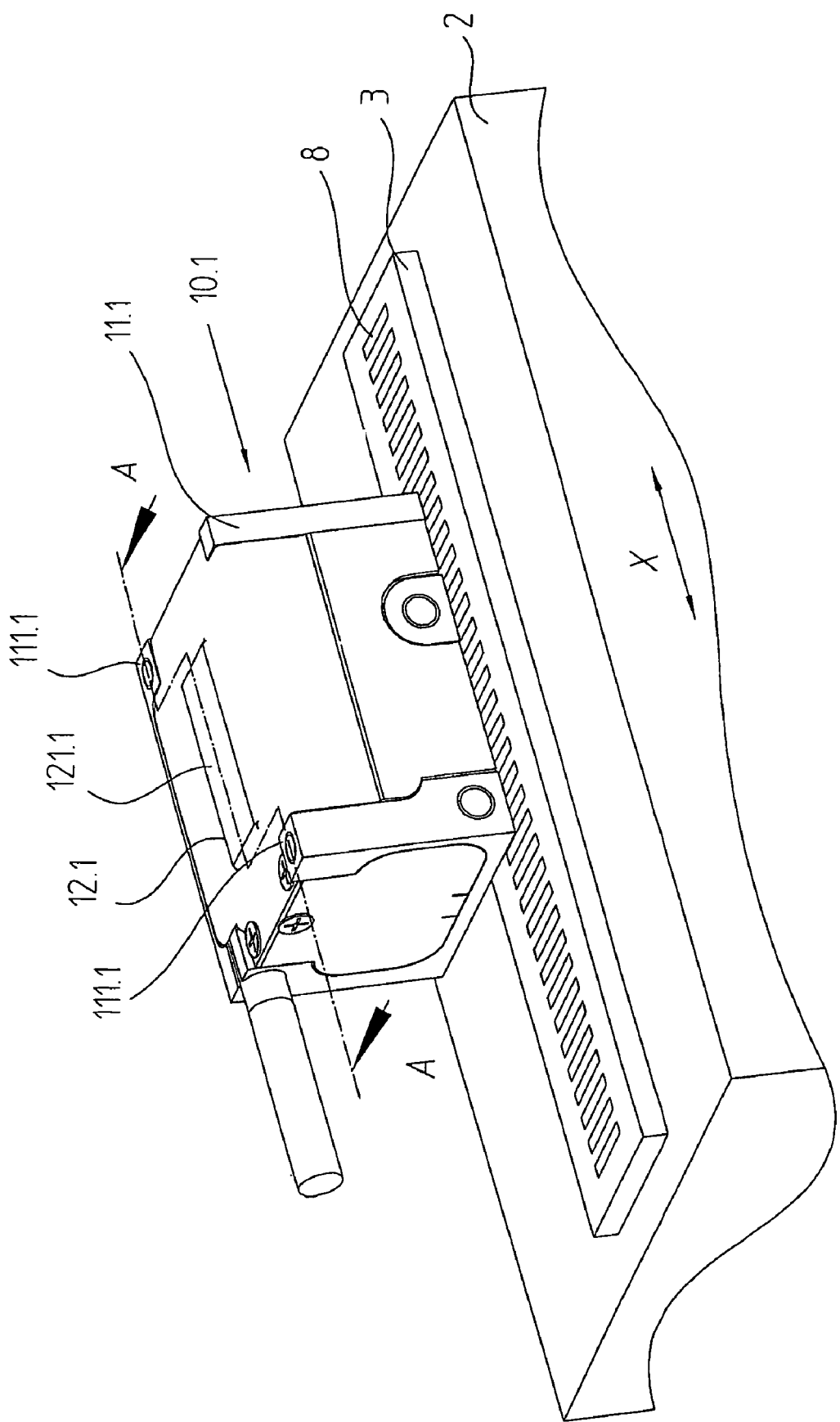
FIG. 1 is a perspective representation of an embodiment of a length-measuring arrangement with an embodiment of a scanning unit in accordance with the present invention.

In the drawing figures the present invention is represented by the example of an optical length-measuring arrangement, by which it is intended to measure the relative positions of two objects 1 and 2, which can be displaced with respect to each other in the measuring direction X. In the course of this, a scale 3 is scanned by a scanning unit 10, which can be moved relative to the scale 3 in the measuring direction X. The scale 3 has a scale graduation 8, which is scanned in incident light by the scanning unit 10. In what follows, different variants of scanning units 10 designed in accordance with the present invention will be explained in greater detail. In what follows, the different variants of scanning units are identified by the reference numeral 10 and the number of the respective variant as the index.

Figure 2:
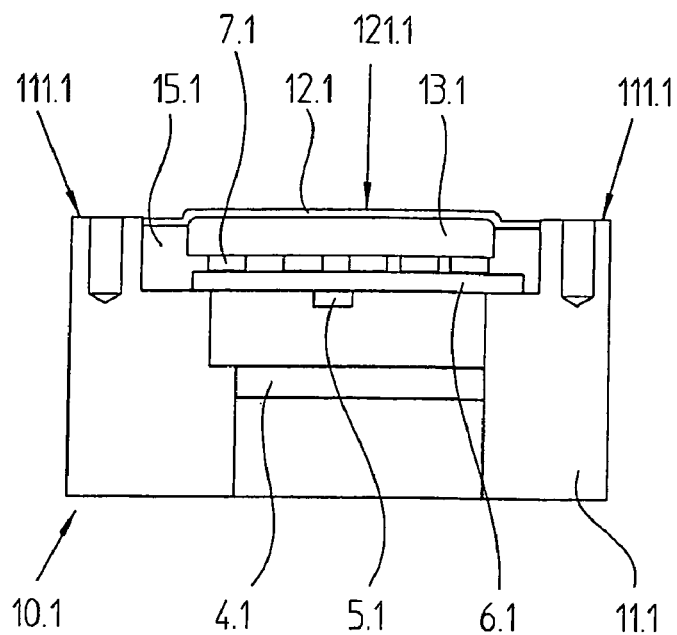
FIG. 2 shows the scanning unit in accordance with FIG. 1 in a section along the line A-A.
Figure 3:
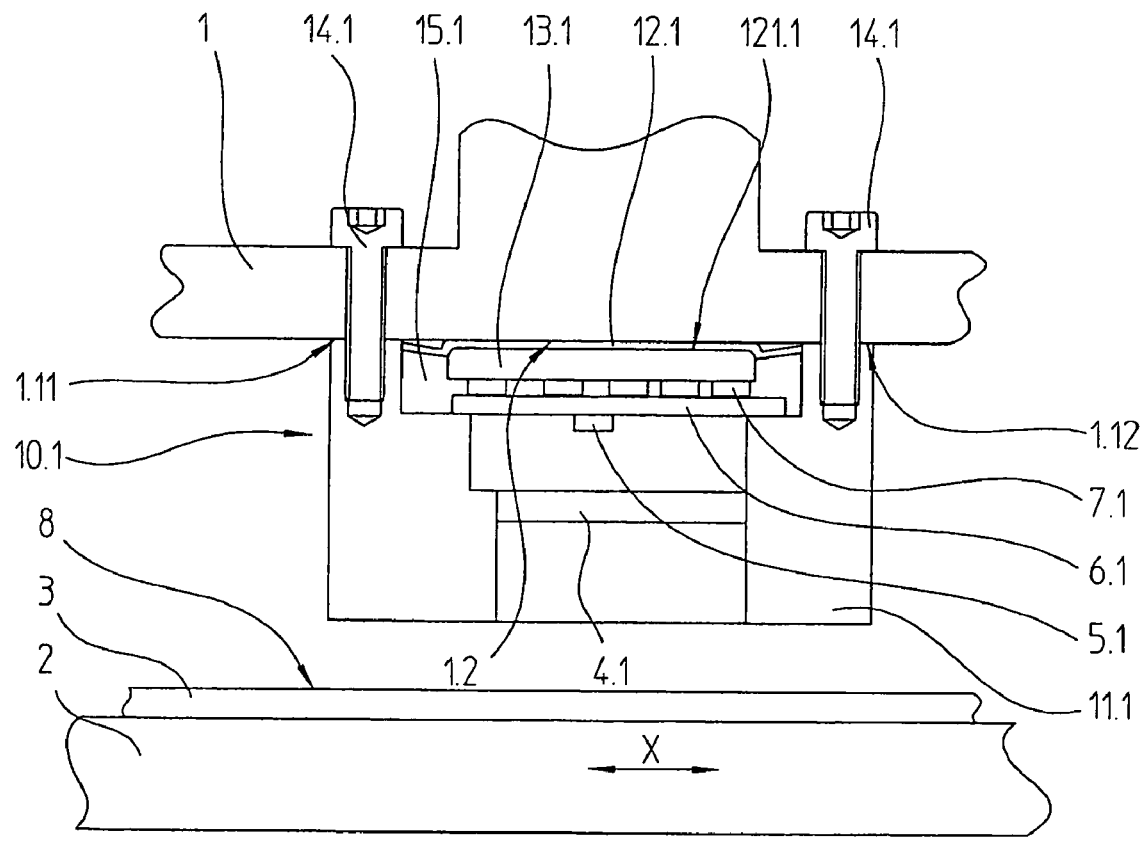
FIG. 3 represents the scanning unit in accordance with FIG. 1 in a section along the line A-A in an installed state on an object to be measured.

A first variant of a scanning unit 10.1 is represented in FIGS. 1 to 3. The scanning unit 10.1 includes a non-represented illuminating unit, which sends out a bundle of light which impacts on the scale 3, is reflected there by the measuring graduation 8 and continues to pass through a scanning plate 4.1, and in the end impacts on the light-sensitive scanning sensors 5.1. In the course of this, the bundle of light from the scanning unit 10.1 is modulated as a function of the position by the measuring graduation 8 on the scale 3. In a known manner, the scanning plate 4.1 has a scanning graduation which is matched to the generated bundle of light.

The scanning sensors 5.1, for example embodied as opto-ASICs, are located on a printed circuit board 6.1. Further electrical components for processing the scanning signals are provided on the printed circuit board 6.1, for example A/D converters, amplifiers 7.1, micro-processors, or respectively interface units. These further electrical components can also be embodied together with the scanning sensors in an opto-ASIC.

In order to achieve a compact design of the scanning unit 10.1, the electrical components 5.1, 7.1 are arranged in a protected manner in an interior space 15.1 of the base body 11.1 of the scanning unit 10.1. Because of the small graduation periods of the measuring graduation 8 and the high displacement speed of the scanning unit 10.1 with respect to the scale 3, high-frequency periodic scanning signals are generated, which must be further processed at a low noise level by the further electrical components, in particular the amplifiers 7.1. The electrical components for processing the scanning signals—of which only the amplifier 7.1 has been schematically represented by way of example and identified—have a large energy requirement and therefore generate a relatively large amount of waste heat.

The scanning unit 10.1 has a base body 11.1, on which the scanning plate 4.1 is fixed in place. The scanning sensors 5.1 detect the relative position of the scale 3 in relation to the scanning plate 4.1, so that the scanning plate 4.1 is the component of the scanning unit 10.1 which determines accuracy. The scanning plate 4.1 can be installed, fixed in place, on an object 1 to be measured by the base body 11.1. This installation should be especially rigid, for which reason a flat contact between the base body 11.1 and the object 1 to be measured must be realized. In the example represented, this contact is achieved by screws 14.1.

The printed circuit board 6.1 with the heat-generating electrical components 7.1 is installed, heat-insulated, on the base body 11.1 and can be manipulated together with it. This can be realized in that the printed circuit board 6.1 itself is made of a material with low heat conduction, and/or the printed circuit board 6.1 is fastened on the base body 11.1 by heat-insulating elements, and/or with the least possible contact. Starting at the heat-generating electrical components 7.1, a heat-conducting track is provided to a contact element 12.1 of the scanning unit 10.1. In the example, this heat-conducting track has a heat-conducting element 13.1, which is designed for transferring heat generated at the electrical components 7.1 from the interior space 15.1 of the scanning unit 10.1 to the contact element 12.1. In the example represented, the heat-conducting element 13.1 is an elastically yielding, electrically insulating part which, on the one hand, is in an as intimate and large-surfaced contact as possible with the electrical component 7.1, and on the other hand is in an as intimate and large-surfaced contact as possible with the contact element 12.1. For this purpose, the heat-conducting element 13.1 is arranged flat and clamped between the electrical components 7.1 and the contact element 12.1. In the example, the heat-conducting element 13.1 is a heat-conducting foil, in particular a polymer foil capable of conducting heat, which is also commercially offered in the form of a foil sold under the trademark of "Softtherm."

The base body 11.1 is embodied to be especially massive and has contact faces 111.1 which, in the course of installation at a first location 1.11 and 1.12, can be brought into contact with the object 1 to be measured by screws 14.1 as the fastening elements.

In the represented example, the contact element 12.1 is embodied as a cover of the scanning unit 10.1, which is resilient in regard to the contact face 111.1 of the base body 11.1, so that it does not interfere with the installation. In order to obtain a good, heat-conducting contact with the object 1 to be measured in the course of installation, the contact face 121.1 of the contact element 12.1 is embodied to be raised and is elastically yielding. This yielding is achieved by two-dimensional bending, or respectively stamping, of a thin sheet metal piece, for example the cover in particular. As can be seen in FIG. 2, this raised contact face 121.1 is spatially arranged between two spaced-apart contact faces 111.1 of the base body 11.1. In this case the contact faces 111.1 of the base body 11.1 are arranged parallel with respect to the contact faces 121.1 of the raised contact element 12.1.

The material of the contact element 12.1 has been selected in such a way that it has good heat-conducting properties. The contact element 12.1 can be arranged in a heat-insulating manner with respect to the base body 11.1, for example by providing heat-insulating insertion elements. These insertion elements can simultaneously act as a seal between the contact element 12.1 and the base body 11.1.

FIG. 3 schematically shows the function of the resilient contact face 121.1 of the contact element 12.1. The accuracy-defining contact faces 111.1 of the base body 11.1 are connected via the screws 14.1 with the object 1 to be measured. In the course of this installation of the scanning unit 10.1, the contact face 121.1 of the contact element 12.1 also comes into contact with the object 1 to be measured. To assure intimate contact over a large surface without affecting the positioning of the base body 11.1, the contact face 121.1 is elastically yielding in the fastening direction, i.e. in a direction perpendicular to the contact face 121.1. Since the heat-conducting element 13.1 located between the contact face 121.1 of the contact element 12.1 and the electrical components 7.1 also yields in the direction in which the contact element 12.1 yields, heat transfer is assured. By these measures a dependable heat-guidance path is created from the electrical components 7.1 via the heat-conducting element 13.1 to the contact face 121.1 with good heat-conducting properties and further to the object 1 to be measured. By this the heat from the scanning unit 10.1 is purposely directed in the direction of the object 1 to be measured, which acts as a heat sink. In this connection the term heat sink means that the thermal mass of the object 1 to be measured is greater than the thermal mass of the scanning unit 10.1, so that the heat introduced by the scanning unit 10.1 into the object 1 to be measured is well distributed.

During measuring operations, i.e. when the scanning unit 10.1 has been installed on the object 1 to be measured, the scanning unit 10.1 is in good heat-conducting contact with the object 1 to be measured at a second location 1.2, so that heat can be transferred to the object 1 to be measured.

It is possible in a manner not represented to also aid heat removal by providing a cooling structure for the object 1 to be measured. Possible cooling structures can be cooling ribs, or a conduit through which a cooling medium flows.

Figure 4:
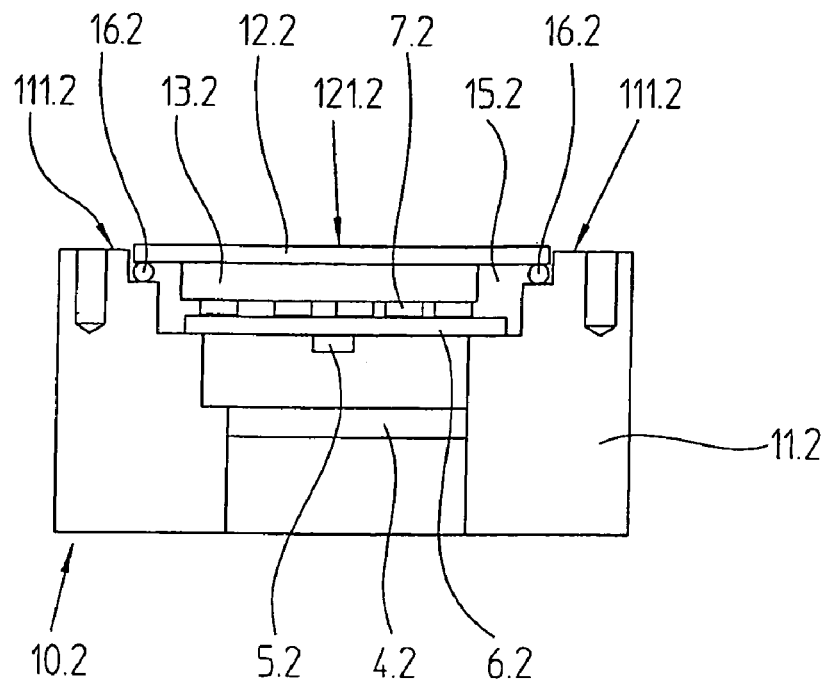
FIG. 4 is a representation in principle of a second embodiment of a scanning unit in cross section to be used with the length-measuring arrangement of FIG. 1 in accordance with the present invention.

The second exemplary embodiment of a scanning unit 10.2 is schematically represented in FIG. 4 in cross section. Again, the contact element 12.2 is constituted by the cover which covers the interior space 15.2 of the scanning unit 10.2. In contrast to the first exemplary embodiment described above, here the contact element 12.2 itself is not embodied to be resilient, instead the resilience of the contact face 121.2 is assured in that the contact element 12.2 is displaceably seated on the base body 11.2 via resilient structure 16.2. In the example, the resiliently yielding structure 16.2 also has the function of a secure seal between the contact element 12.2 and the base body 11.2. The further represented elements, such as the scanning plate 4.2, scanning sensors 5.2, printed circuit board 6.2, electrical component 7.2, heat-conducting element 13.2 and contact faces 111.2 at the base body 11.2 correspond to those of the first embodiment.

Figure 5:
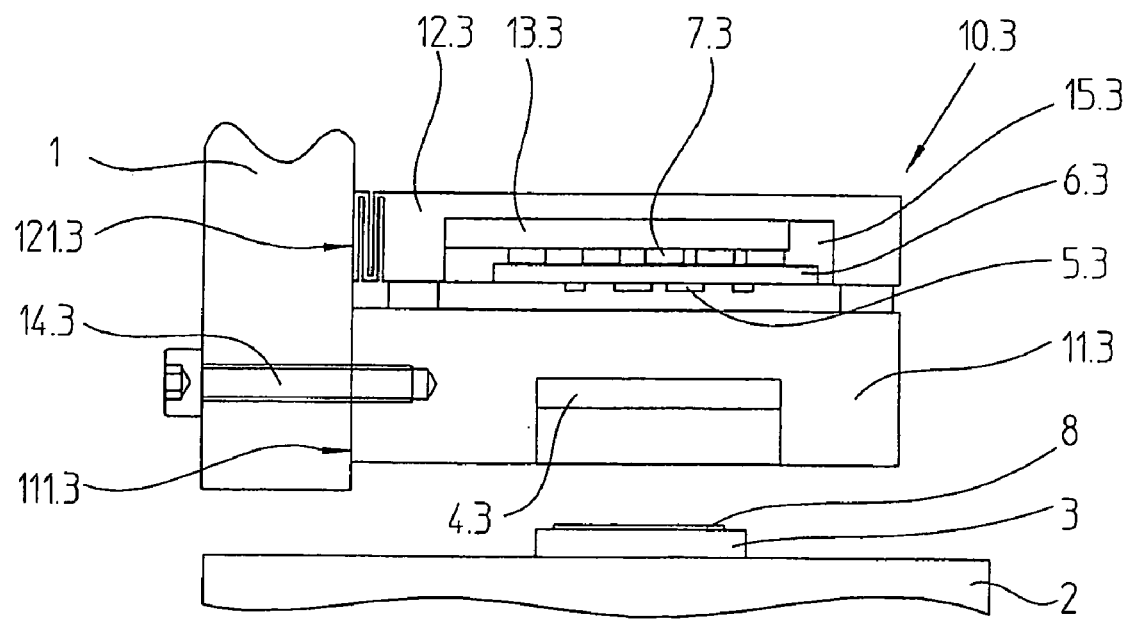
FIG. 5 is a representation in principle of a third embodiment of a scanning unit in cross section to be used with the length-measuring arrangement of FIG. 1 in accordance with the present invention.

A third exemplary embodiment of a scanning unit 10.3 is represented in FIG. 5. The represented elements, such as the scanning plate 4.3, printed circuit board 6.3, heat-conducting element 13.3 and electrical component 7.3 correspond to those of the first embodiment of FIGS. 1 and 2. The scanning unit 10.3 includes an illuminating unit, which sends out a beam of light which impinges on the scale 3, is reflected there by the measuring graduation 8 and continues through the scanning plate 4.3 and finally impinges on light-sensitive scanning sensor 5.3. In the course of this, the beam of light is modulated by the measuring graduation 8 as a function of the position at the scale 3. In a known manner, the scale 3 has a periodic scanning graduation which is matched to the generated bundle of light.

The scanning sensors 5.3 are located on a printed circuit board 6.3. Further electrical components for processing the scanning signals, for example A/D converters, amplifiers 7.3, microprocessors, or respectively interface units, are located on the printed circuit board 6.3.

To achieve a compact construction of the scanning unit 10.3, the electrical components 5.3. 7.3 are arranged in an interior space 15.3 of the scanning unit 10.3. Because of the small graduation periods of the measuring graduation 8 and the high displacement speed of the scanning unit 10.3 with respect to the scale 3, high-frequency periodic scanning signals are generated, which must be further processed at a low noise level by the further electrical components, in particular the amplifiers 7.3. The electrical components for processing the scanning signals—of which only the amplifier 7.3 has been schematically represented by way of example and identified—have a large energy requirement and therefore generate a relatively large amount of waste heat.

The scanning unit 10.3 has a base body 11.3, on which the scanning plate 4.3 is fixed in place. The scanning sensors 5.3 detect the relative position of the scale 3 in relation to the scanning plate 4.3, so that the scanning plate 4.3 is the component of the scanning unit 10.3 which determines accuracy. The scanning plate 4.3 can be installed, fixed in place, on one of the objects 1 to be measured by the base body 11.3. This installation should be especially rigid, for which reason a flat contact between the base body 11.3 and the object 1 to be measured must be realized. In the example represented, this contact is achieved by screws 14.3.

The printed circuit board 6.3 with the heat-generating electrical components 7.3 is installed, heat-insulated, on the base body 11.3 and can be manipulated together with it. Starting at the heat-generating electrical components 7.3, a heat-conducting track to a contact element 12.3 of the scanning unit 10.3 is provided. This heat-conducting track has a heat-conducting element 13.3, which is designed for transferring heat generated at the electrical components 7.3 from the interior space 15.3 of the scanning unit 10.3 to the contact element 12.3. In the example represented, the heat-conducting element 13.3 is an elastically yielding, electrically insulating part which, on the one hand, is in an as intimate and large-surfaced contact as possible with the electrical component 7.1, and on the other hand is in an as intimate and large-surfaced contact as possible with the contact element 12.3. In the example, the heat-conducting element 13.3 is a heat-conducting foil, in particular a polymer foil capable of conducting heat, which is also commercially offered in the form of a foil sold under the trademark of "Softtherm".

The scanning unit 10.3 is fastened, fixed in place, by installing the base body 11.3 on the object 1 to be measured.

In this case, the base body 11.3 comes into contact through a first contact face 111.3 at a first location with the object 1 to be measured and, through a second contact face 121.3, the contact element 12.3 at a second location with the object 1 to be measured. For installation, the contact face 121.3 of the contact element 12.3, i.e. second contact face 121.3, is elastically yielding, i.e. resilient, so that, on the one hand, a dependable two-dimensional contact with the object 1 to be measured is assured, and on the other hand no mechanical redundancy and reaction in regard to the base body 11.3 results. In the example, elastic yielding has been realized by a meander-like design of an area of the contact element 12.3.

Figure 6:
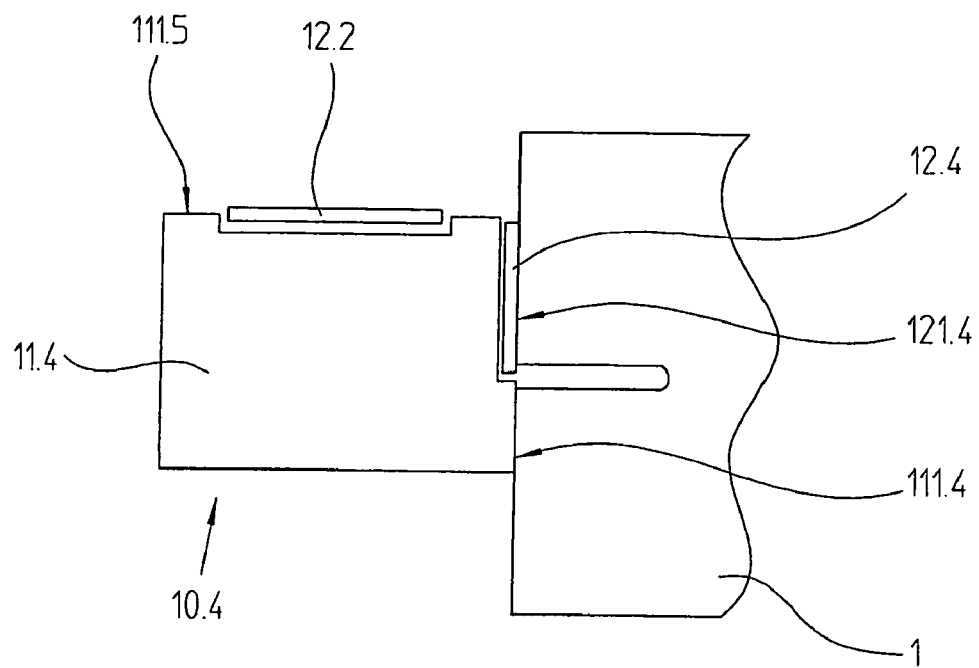
FIG. 6 is a schematic representation of a possible installation of the scanning units of FIGS. 1-5 on an object to be measured in accordance with the present invention.
Figure 7:
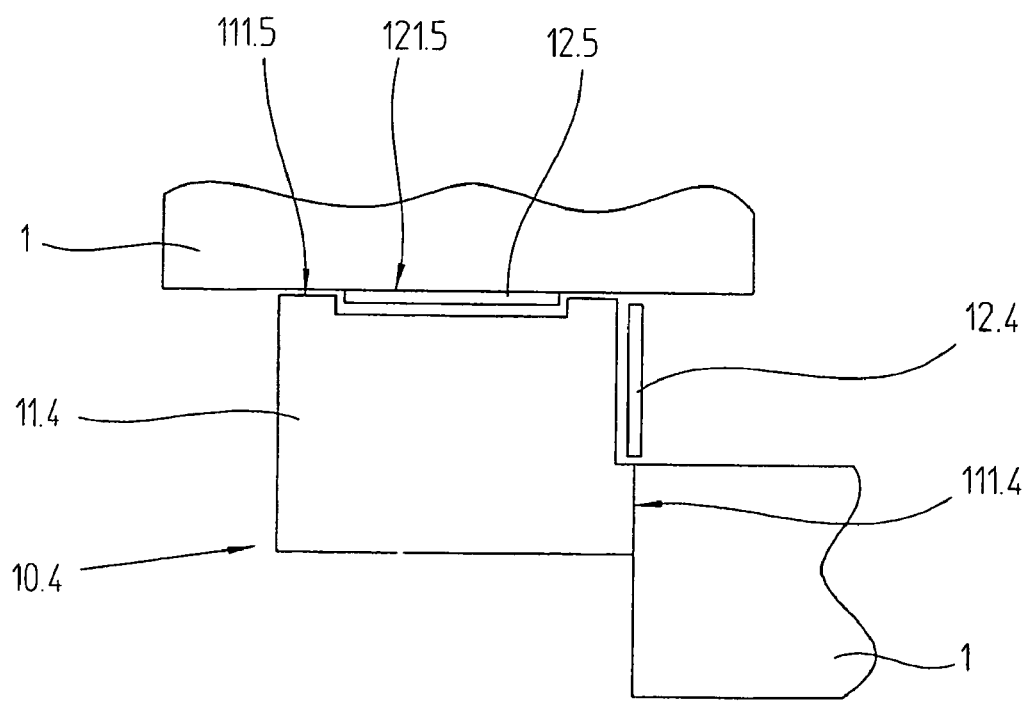
FIG. 7 is a further schematic representation of the installation of the scanning units of FIGS. 1-5 on an object to be measured of FIG. 6.

A scanning unit 10.4 is schematically represented in FIGS. 6 and 7, which has two contact faces 111.4 and 111.5 of the base body 11.4, which are arranged perpendicularly with respect to each other. This allows a selective installation on the object 1 to be measured by one of these contact faces 111.4 or 111.5. In each one of these installation variations it is assured by the contact faces 121.4 and 121.5, also arranged perpendicularly with respect to each other, of the contact element 12.4, 12.5, that at least one of these contact faces 121.4, 121.5 comes into contact with the object 1 to be measured for heat transfer and heat removal.

In FIG. 6, the contact face 111.4 of the base body is arranged parallel in relation to the contact face 121.4 of the contact element 12.4. The contact face 111.4 of the base body 11.4 contacts the object 1 to be measured, distanced from the contact face 121.4 of the contact element 12.4. This distance should be as large as possible in order to avoid a heat transfer into the base body 11.4. Heat insulation between the base body 11.4 and the contact element 12.4 can be further increased by a specific design of the object 1 to be measured. To this end, in the example in accordance with FIG. 6 the location of contact with the base body 11.4 is spaced apart from the location of contact with the contact element 12.4, and the object 1 to be measured has a separation in the form of a groove. In the example in accordance with FIG. 7, the locations of the contacts are even further spaced apart from each other, and a physical separation of the object 1 to be measured has also been realized.

The foregoing description is provided to illustrate the present invention, and is not to be construed as a limitation. Numerous additions, substitutions and other changes can be made to the present invention without departing from its scope as set forth in the appended claims.

We claim:

1. A scanning unit of a position measuring arrangement for scanning a measuring graduation of a scale, the scanning unit comprising:
a base body including an interior space; wherein said base body can be installed, fixed in place, on an object to be measured, wherein said base body comes into contact with a first contact face at a first location of said object to be measured;
a heat-generating electrical component in said interior;
a contact element with a second contact face which, in the course of installing said base body, enters into contact at a second location of said object to be measured, wherein said second contact face is designed to be elastically yielding; and
a heat-conducting element, which is designed for transferring heat generated by an electrical component from said interior space to said contact element.

2. The scanning unit in accordance with claim 1, wherein said second contact face is arranged in a yielding manner on said base body by a resilient structure.

3. The scanning unit in accordance with claim 2, wherein said second contact face is a component of a removable cover, which covers said interior space.

4. The scanning unit in accordance with claim 1, wherein said second contact face is a component of a removable cover, which covers said interior space.

5. The scanning unit in accordance with claim 1, wherein in that, in an uninstalled state, said first contact face is set back with respect to said second contact face.

6. The scanning unit in accordance with claim 1, wherein said contact element is arranged to be heat-insulated against said base body.

7. The scanning unit in accordance with claim 1, wherein a heat-conducting path is defined by having said heat-conducting element positioned between said electrical component and said contact element, wherein said heat-conducting element is designed to be elastic and on one hand contacts said electrical component and on another hand said contact element.

8. The scanning unit in accordance with claim 1, further comprising a scanning plate fixed in place on said base body.

9. The scanning unit in accordance with claim 1, wherein said second contact face is embodied as a resilient sheet metal element, which is designed to be resiliently displaceable in a direction of said second location of said object to be measured.

10. The scanning unit in accordance with claim 1, wherein a heat conducting path is defined by having said heat-conducting element positioned between said electrical component and said contact element, wherein said heat-conducting element is designed to be elastic and on one hand contacts said electrical component and on another hand said contact element.

11. The scanning unit in accordance with claim 1, wherein said second contact face is designed to be elastically yielding with respect to said first contact face.

12. A scanning unit of a position measuring arrangement for scanning a measuring graduation of a scale, the scanning unit comprising:
a base body including an interior space; wherein said base body can be installed, fixed in place, on an object to be measured, wherein said base body comes into contact with a first contact face at a first location of said object to be measured;
a heat-generating electrical component in said interior;
a contact element with a second contact face which, in the course of installing said base body, enters into contact at a second location of said object to be measured, wherein said second contact face is designed to be elastically yielding and, wherein said second contact face is embodied as a resilient sheet metal element, which is designed to be resiliently displaceable in a direction of said second location of said object to be measured; and
a heat-conducting element, which is designed for transferring heat generated by an electrical component from said interior space to said contact element.

13. The scanning unit in accordance with claim 12, wherein said second contact face is a component of a removable cover, which covers said interior space.

14. A scanning unit of a position measuring arrangement for scanning a measuring graduation of a scale, the scanning unit comprising:
a base body including an interior space; wherein said base body can be installed, fixed in place, on an object to be measured, wherein said base body comes into contact with a first contact face at a first location of said object to be measured;

a heat-generating electrical component in said interior;
a contact element with a second contact face which, in the course of installing said base body, enters into contact at a second location of said object to be measured; and
a heat-conducting element, which is designed for transferring heat generated by an electrical component from said interior space to said contact element, wherein a heat conducting path is defined by having said heat-conducting element positioned between said electrical component and said contact element, wherein said heat-conducting element is designed to be elastic and on one hand contacts said electrical component and on another hand said contact element.

* * * * *